US011048276B2

(12) United States Patent
Sasaki (10) Patent No.: US 11,048,276 B2
(45) Date of Patent: Jun. 29, 2021

(54) MEASURING DEVICE, CONTROL DEVICE FOR UNMANNED AERIAL VEHICLE AND COMPUTER PROGRAM PRODUCT FOR CONTROLLING UNMANNED AERIAL VEHICLE

(71) Applicant: TOPCON CORPORATION, Tokyo (JP)

(72) Inventor: You Sasaki, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 107 days.

(21) Appl. No.: 16/160,187

(22) Filed: Oct. 15, 2018

(65) Prior Publication Data

US 2019/0113937 A1  Apr. 18, 2019

(30) Foreign Application Priority Data

Oct. 17, 2017  (JP) .............................. JP2017-201004

(51) Int. Cl.
*G05D 1/10* (2006.01)
*G05D 1/12* (2006.01)
(Continued)

(52) U.S. Cl.
CPC ........... *G05D 1/101* (2013.01); *B64C 39/024* (2013.01); *G05D 1/102* (2013.01); *G05D 1/12* (2013.01);
(Continued)

(58) Field of Classification Search
CPC ...................................................... G05D 1/12
See application file for complete search history.

(56) References Cited

U.S. PATENT DOCUMENTS 3,665,198 A *  5/1972  Barstad ..................... G01S 1/02
                                                  250/349
7,809,191 B2 * 10/2010  Furukado ................. G06T 7/73
                                                  382/174
(Continued)

FOREIGN PATENT DOCUMENTS

EP          3424814 A1 *  1/2019  ............... G05D 1/12
JP       2008-268004 A    11/2008
(Continued)

OTHER PUBLICATIONS

Communication pursuant to Article 94(3) EPC dated May 12, 2019, in connection with European Patent Application No. 18199439.3, filed Oct. 9, 2018, 8 pgs.

(Continued)

*Primary Examiner* — Shelley Chen
(74) *Attorney, Agent, or Firm* — Chiesa Shahinian & Giantomasi PC (57) ABSTRACT

Objects of the present disclosure include providing a technique which can efficiently guide an unmanned aerial vehicle to a particular part of a target object. Provided is a control device for an unmanned aerial vehicle including a camera. The control device comprises a bright spot detection unit configured to detect, from an image captured by camera, a bright spot generated by a laser pointer; a flight control unit configured to perform, based on position of the bright spot in the image, flight control over the unmanned aerial vehicle. In such structure, the camera detects the bright spot, generated by the irradiation of spot-type indicating laser beam from the total station, on a wall surface, and the flight control over the unmanned aerial vehicle is performed in a manner that the unmanned aerial vehicle follows the bright spot.

10 Claims, 5 Drawing Sheets

(51) Int. Cl.
  *B64C 39/02* (2006.01)
  *G08G 5/00* (2006.01)
  *G06K 9/00* (2006.01)
  *G06T 7/90* (2017.01)
  *G06T 7/73* (2017.01)

(52) U.S. Cl.
  CPC .............. *G06K 9/0063* (2013.01); *G06T 7/73* (2017.01); *G06T 7/90* (2017.01); *G08G 5/0069* (2013.01); *G08G 5/0073* (2013.01); *B64C 2201/141* (2013.01); *G06T 2207/10032* (2013.01)

(56) References Cited

U.S. PATENT DOCUMENTS

| | | | |
|---|---|---|---|
| 7,861,423 B2 | 1/2011 | Kumagai et al. | |
| 7,969,558 B2 | 6/2011 | Hall | |
| 8,767,190 B2 | 7/2014 | Hall | |
| 10,061,328 B2 * | 8/2018 | Canoy | G08G 5/0056 |
| 10,783,794 B2 * | 9/2020 | Li | G05D 1/0094 |
| 2009/0235541 A1 | 9/2009 | Kumagai et al. | |
| 2009/0241358 A1 | 10/2009 | Ohtomo et al. | |
| 2009/0306840 A1 * | 12/2009 | Blenkhorn | G05D 1/0676 701/16 |
| 2010/0256940 A1 | 10/2010 | Ogawa et al. | |
| 2012/0242830 A1 | 9/2012 | Kumagai et al. | |
| 2012/0307042 A1 * | 12/2012 | Lee | H04N 5/23212 348/114 |
| 2015/0293224 A1 | 10/2015 | Eldada et al. | |
| 2017/0045894 A1 * | 2/2017 | Canoy | G08G 5/0013 |
| 2019/0055017 A1 * | 2/2019 | Oba | G01S 17/87 |
| 2019/0094888 A1 * | 3/2019 | Hiroi | H04N 9/3182 |
| 2019/0235523 A1 * | 8/2019 | Rozenberg | G05D 1/042 |
| 2019/0354115 A1 * | 11/2019 | Zhang | H04N 5/23299 |
| 2020/0066169 A1 * | 2/2020 | Li | G01C 11/025 |

FOREIGN PATENT DOCUMENTS

| | | | |
|---|---|---|---|
| JP | 2009-229192 A | 10/2009 | |
| JP | 2010-151682 A | 7/2010 | |
| JP | 2012-202821 A | 10/2012 | |
| JP | 5124319 B2 | 1/2013 | |
| JP | 2017-154577 A | 9/2017 | |
| WO | WO-2014147042 A2 * | 9/2014 | G01S 17/46 |
| WO | 2017150433 A1 | 9/2017 | |
| WO | WO-2017169516 A1 * | 10/2017 | G05D 1/0094 |

OTHER PUBLICATIONS

Extended European Search Report dated Mar. 7, 2019, in connection with European Patent Application No. 18199439.3, filed Oct. 9, 2018, 9 pgs.

Communication pursuant to Article 94(3) EPC dated Jul. 24, 2020, in connection with European Patent Application No. 18199439.3, filed Oct. 9, 2018, 6 pgs.

* cited by examiner

MEASURING DEVICE, CONTROL DEVICE FOR UNMANNED AERIAL VEHICLE AND COMPUTER PROGRAM PRODUCT FOR CONTROLLING UNMANNED AERIAL VEHICLE

CROSS-REFERENCE TO RELATED APPLICATION

This application claims the priority of Japanese Patent Application No. 2017-201004, filed Oct. 17, 2017, the entire disclosure of which is incorporated by reference herein.

TECHNICAL FIELD

The present disclosure relates to the technique for controlling an unmanned aerial vehicle.

BACKGROUND ART

An UAV (Unmanned Aerial Vehicle) can be considered to be used for inspecting a bridge pier or a slope reinforced with concrete. In this technique, the UAV is equipped with a laser scanner or a camera to perform laser scanning or photographing of the bridge pier or the slope. A technique for inspecting a facility using a UAV is disclosed in Patent Document 1: Japanese Patent Publication No. 2017-154577.

SUMMARY

Problem to be Solved by Embodiments of the Disclosure

For example, during an inspection of an inner wall of a tunnel or a bridge pier, it is sometimes desirable to photograph a particular portion. In this case, an accurate flight control of the UAV is required. As to a method for performing an accurate fight control over the UAV, the following configuration may be considered: a radar or a laser scanner is mounted on the UAV, then a high-precision IMU (inertial measurement device) is mounted, and the UAV is caused to fly while performing a three-dimensional measurement for the surroundings. However, in this method, due to the equipment equipped on the UAV, the problems in increasing of the weight, electrical power consumption, and cost are all presented. In addition, how to determine the positional relationship of the UAV with respect to a target object to be photographed is also a problem.

In such background, objects of the present disclosure include providing a technique which can efficiently guide a UAV to a particular part of a target object.

Means for Solving at Least the Above Problems

Embodiments of the present disclosure provide a control device for an unmanned aerial vehicle, with the unmanned aerial vehicle including a camera. The control device for the unmanned aerial vehicle includes: a bright spot detection unit configured to detect, from an image captured by the camera, a bright spot generated by a laser pointer; and a control unit configured to control, based on a position of the bright spot in the image, a posture of at least one of the unmanned aerial vehicle and the camera.

In an embodiment of the present disclosure, a configuration may be exemplified in which the control unit is configured to control, based on the position of the bright spot in the image captured by the camera, a position of the unmanned aerial vehicle. In addition, in an embodiment of the present disclosure, a configuration may be exemplified in which if the bright spot detection unit detects a movement of the bright spot, the control unit controls, based on the movement of the bright spot, the posture of at least one of the unmanned aerial vehicle and the camera.

In an embodiment of the present disclosure, a configuration may be exemplified in which a pattern is drawn by means of the bright spot, and the posture is controlled based on an orientation of the pattern in the image captured by the camera. In an embodiment of the present disclosure, a configuration may be exemplified in which a pattern is drawn by means of the bright spot, and the posture is controlled based on a ratio of dimensions of the pattern in a screen of the image captured by the camera, with the dimensions in multiple axial directions intersecting one another.

In an embodiment of the present disclosure, a configuration may be exemplified in which a pattern is drawn by means of the bright spot, and the position of the unmanned aerial vehicle is controlled based on a size of the pattern in the image captured by the camera. In addition, an embodiment of the present disclosure may also provide an unmanned aerial vehicle equipped with the above control device.

Embodiments of the present disclosure may also provide a measuring device including a control device according to the claims, the laser pointer and a three-dimensional position determining unit. The three-dimensional position determining unit is configured to determine a three-dimensional position of a bright spot generated by the laser pointer. The bright spot moves along a predetermined path, and positions of the path are obtained in advance. As to the measuring device, a TS (Total Station) may be exemplified which has the function of controlling the flight of a UAV using the bright spot generated by the laser pointer described above.

Embodiments of the present disclosure may also provide a method for controlling an unmanned aerial vehicle, with the unmanned aerial vehicle including a camera. In the method for controlling an unmanned aerial vehicle, a bright spot generated by a laser pointer is detected from an image captured by the camera; and a posture of at least one of the unmanned aerial vehicle and the camera is controlled based on a position of the bright spot in the image.

Embodiments of the present disclosure may also provide a computer program product for controlling an unmanned aerial vehicle, comprising code instructions which, when executed by a computer, cause the computer to function as a control device for the unmanned aerial vehicle including a camera, and the computer is caused to function as a bright spot detection unit and a control unit. Specifically, the bright spot detection unit is configured to detect, from an image captured by the camera, a bright spot generated by a laser pointer; and the control unit is configured to control, based on a position of the bright spot in the image, a posture of at least one of the unmanned aerial vehicle and the camera.

Embodiments of the present disclosure provide a method for controlling an unmanned aerial vehicle by using the total station functioning as a laser pointer. Spot-type indicating laser beam irradiates a target object from the total station installed at a known position, a bright spot generated by the spot-type indicating laser beam on the target object is photographed with a camera equipped on the unmanned aerial vehicle, flight control of the unmanned aerial vehicle is performed in such a manner that the bright spot appears at a particular screen position in an image captured by the camera, and a position, which is irradiated by the spot-type indicating laser beam from the total station, is moved along a particular preset path, so that the unmanned aerial vehicle flies along the path.

Effect of the Disclosure

According to embodiments of the present disclosure, a technique which can efficiently guide a UAV to a particular part of a target object is provided.

DESCRIPTION OF THE REFERENCE NUMERALS

100—TS (Total Station), 200—UAV, 201—Camera, 300—Wall Surface, 301—Bright Spot, 302—Moving Path of the Bright Spot.

DETAILED DESCRIPTION

1. First Embodiment (Overview)

Figure 1:
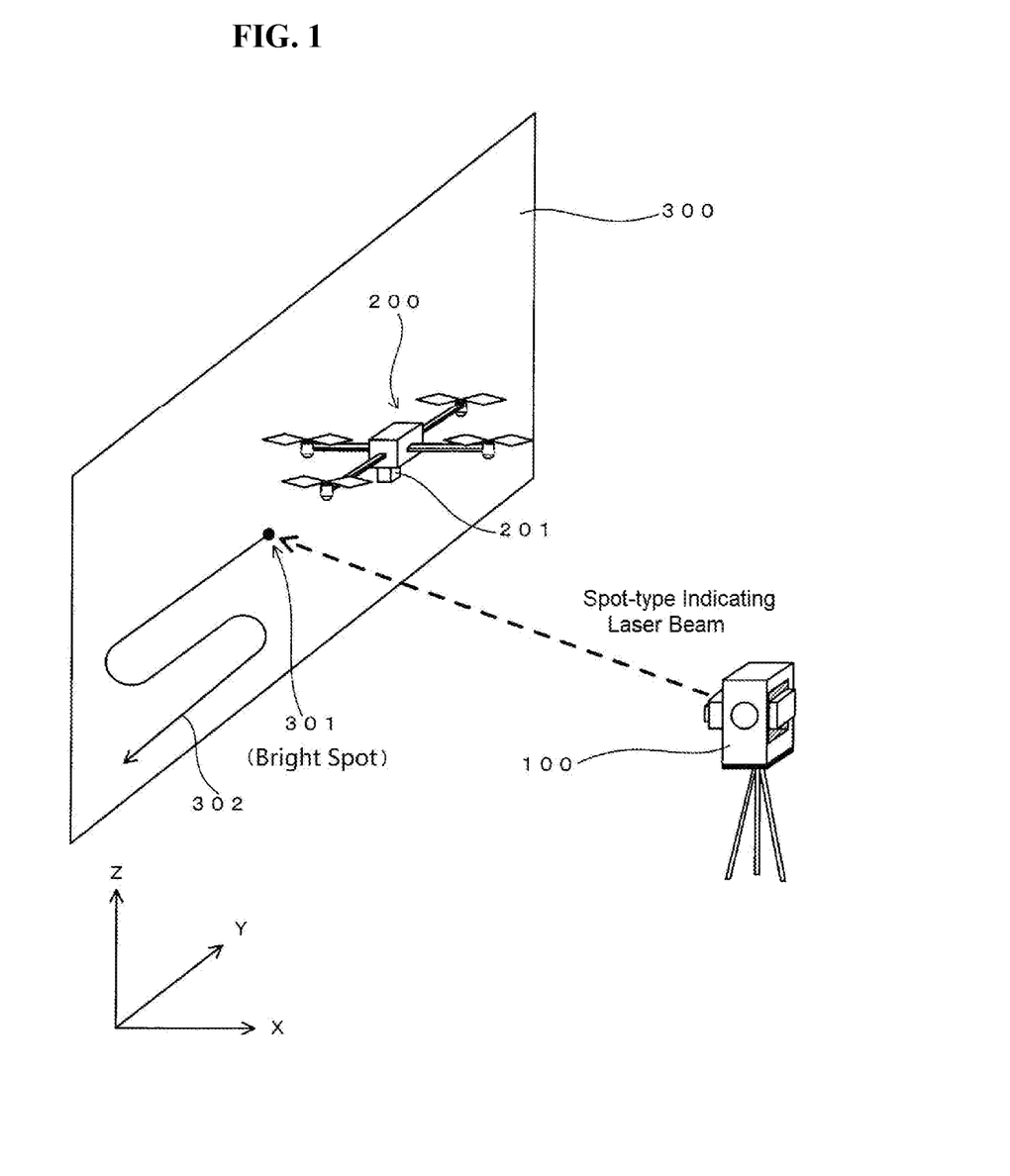
FIG. 1 is a diagram showing an overview of an embodiment.

FIG. 1 shows a UAV 200 which photographs a wall surface 300 with a camera 201. The wall surface 300 is, for example, a cliff or slope reinforced with concrete, a wall surface of a tunnel, a side surface of a bridge pier, a side surface of a construction such as a building, or the like. FIG. 1 shows an example in which the wall surface 300 is made of concrete and the degree of cracking or aging of the wall surface is determined by an image captured by the camera 201.

Spot-type indicating laser beam irradiates the wall surface 300 from a TS (Total Station) 100 installed at a known position. At a reflection point of the spot-type indicating laser beam on the wall surface 300, a bright spot 301 is formed due to the reflection of the laser. The laser also serves as distance measuring light, and three-dimensional coordinates of the bright spot 301, observed from the TS 100, are measured by the TS 100. In addition, the TS 100 has a telescope and a camera, and an image, centered on the bright spot 301, of the wall surface 300 is obtained by the TS 100.

The UAV 200 has a camera 201, and the UAV 200 flies along the wall surface 300 while photographing the wall surface 300 with the camera 201. In such case, the bright spot 301 appears in the image captured by the camera 201 is recognized at the side of the UAV 200, and a flight control of the UAV 200 is performed using the bright spot 301.

The TS 100 is installed at a known position, and the TS 100 causes the bright spot generated by the spot-type indicating laser beam to move in a wall surface to be photographed by the UAV 200. For example, the UAV 200 is moved along with the movement of the bright spot 301 by moving the bright spot 301 along a path 302. In addition, at this time, an area, containing the bright spot 301, of the wall surface 300 is photographed by the camera 201.

(TS (Total Station))

Figure 2:
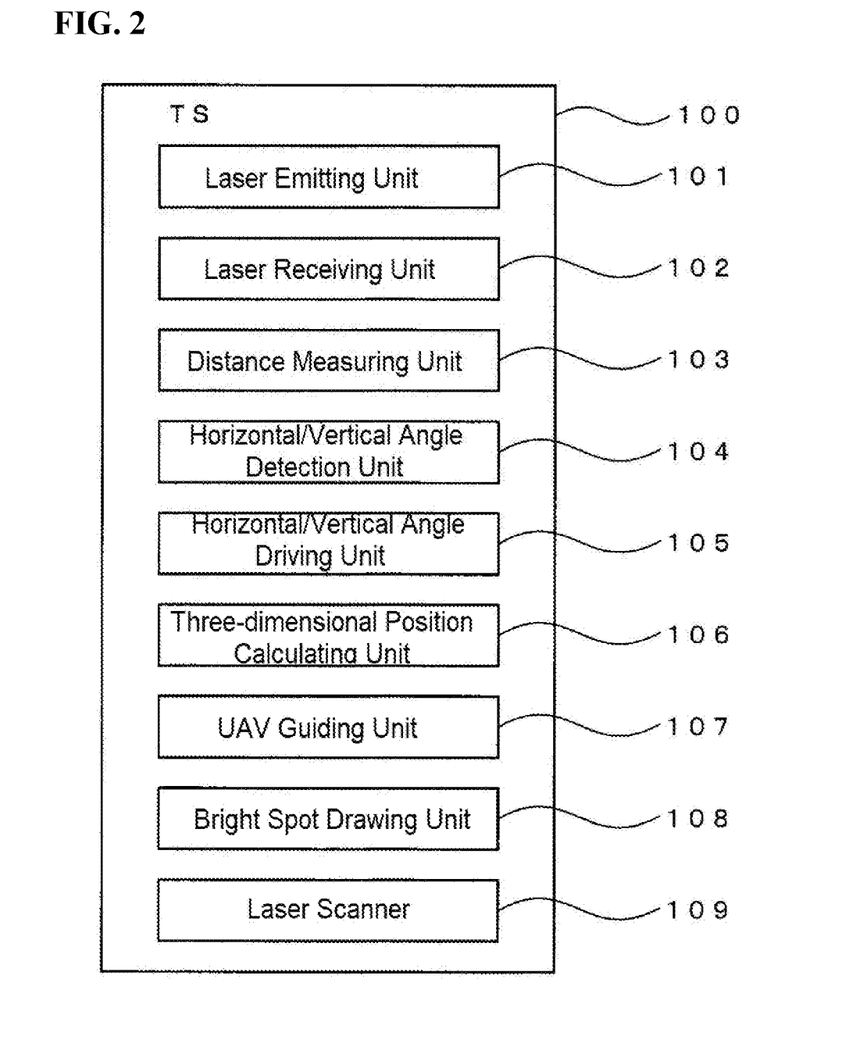
FIG. 2 is a block diagram of an embodiment.

The TS 100 will be described below. FIG. 2 is a block diagram of the TS 100. The TS 100 has a laser emitting unit 101, a laser receiving unit 102, a distance measuring unit 103, a horizontal/vertical angle detection unit 104, a horizontal/vertical angle driving unit 105, a three-dimensional position calculating unit 106, a UAV guiding unit (a light spot position control unit) 107, a bright spot drawing unit 108 and a laser scanner 109. The TS (Total Station) is described in Japanese Patent Publication No. 2009-229192, Japanese Patent Publication No. 2012-202821, Japanese Patent No. 5124319, etc.

The laser emitting unit 101 emits spot-type indicating laser beam which also serves as distance measuring light. The light irradiates a target object via an optical system which is not shown. Here, visible light is adopted as the spot-type indicating laser beam. The laser receiving unit 102 receives, via an optical system which is not shown, reflected light of the spot-type indicating laser beam that irradiates on the target object and reflected by the target object.

The distance measuring unit 103 calculates, based on the flying time of the spot-type indicating laser beam which also serves as the distance measuring light, a distance from the TS 100 to the bright spot 301. Specifically, an optical path of reference light is provided inside the TS 100, and the distance from the TS 100 to the bright spot 301 is calculated based on a phase difference between the reference light and the distance measuring light (which also serves as the spot-type indicating laser beam) received by the laser receiving unit 102.

The TS 100 has a main body capable of rotating horizontally. A movable portion capable of rotating in a vertical direction (rotational control of an elevation angle and a depression angle) is mounted on the main body. The movable portion is fixed thereon with optical systems of the laser emitting unit 101, the laser receiving unit 102 and the distance measuring unit 103, and can control the orientations, in the horizontal direction and the vertical direction, of an optical axis of the spot-type indicating laser beam which also serves as the distance measuring light.

The horizontal/vertical angle detection unit 104 detects a horizontal angle (degree of an angle in the horizontal direction) and a vertical angle (degree of the elevation angle or the depression angle) of the above-mentioned movable portion. An angle detection is performed by a rotary encoder. For a basis standard for an angle measurement, for example, examples of the measurement may be shown as follows: for the horizontal angle, the north direction is regarded as 0°, and an angle in a clockwise direction is detected; and for the vertical angle, the horizontal position is regarded as 0°, and the detection can be performed with the elevation angle being positive (+) and the depression angle being negative (−). Furthermore, the TS 100 is installed at a known position on a map coordinate system (absolute coordinate system). The map coordinate system is a global coordinate system used in a GNSS (Global Navigation Satellite System).

The horizontal/vertical angle driving unit 105 has an engine or a drive circuit configured to drive the rotation of the above-mentioned movable portion in the horizontal direction and drive the rotation of the movable portion in the vertical direction. The position control of the bright spot 301 is performed by controlling the horizontal angle and the vertical angle of the above-mentioned movable portion.

The three-dimensional position calculating unit 106 calculates, based on the distance calculated by the distance measuring unit 103 and the direction of the bright spot 301 (the direction from the TS 100) detected by the horizontal/ vertical angle detection unit 104, three-dimensional coordinate values of the bright spot 301. The three-dimensional coordinate values of the bright spot 301 are obtained as coordinate values on a TS coordinate system with the TS 100 as the origin. Examples of the TS coordinate system may include an XYZ coordinate system in which the east direction is regarded as an X-axis, the north direction is regarded as a Y-axis, and the vertical upward direction is regarded as a Z-axis.

The UAV guiding unit (bright spot position control unit) 107 performs a control over the moving of the bright spot 301 of FIG. 1 along the path 302. The movement of the bright spot 301 is achieved by the driving, via the horizontal/vertical angle driving unit 105, the rotation of the movable portion of the TS 100 in the horizontal direction and in the vertical direction. In the technique disclosed in the present specification, the UAV 200 flies in such a manner as to follow the bright spot 301. The UAV guiding unit 107 moves a pattern formed by the bright spot 301 along a path in which the UAV 200 is desired to fly, thereby guiding the flight of the UAV 200. As for the movement path 302 of the pattern formed by the bright spot 301, the form of such movement path 302 may be determined in advance, or may also be a form set through movement by an operator.

For example, a case of inspecting a bridge by the UAV 200 is considered. Here, three-dimensional model data of the bridge is obtained in advance. In this case, the UAV 200 is equipped with a video camera configured to photograph the bridge, and inspects, based on the stereo image, the presence or absence of cracking or the state of aging of concrete, the state of a bolt joint portion, and the like. At this time, the path 302 is set along a part which is a target object to be photographed, and then the pattern formed by the bright spot 301 is moved. Moreover, the UAV 200 flies by following the movement of the bright spot 301. The guidance of the bright spot 301 at this time is performed by the UAV guiding unit (the bright spot position control unit) 107. The flight control of the UAV 200 using the bright spot 301 is performed by the function of the UAV guiding unit (the bright spot position control unit) 107.

The bright spot drawing unit 108 moves the bright spot 301 by irradiating the spot-type indicating laser beam (distance measuring light) and at the same time controlling the horizontal angle and the vertical angle of the irradiation direction, and controls, based on the trajectory of the bright spot 301, the drawing. Through the drawing performed by using the bright spot, a pattern with a particular shape formed by the bright spot (a bright spot-drawn pattern) is formed on a target surface (for example, the wall surface 300 of FIG. 1).

Figure 4:
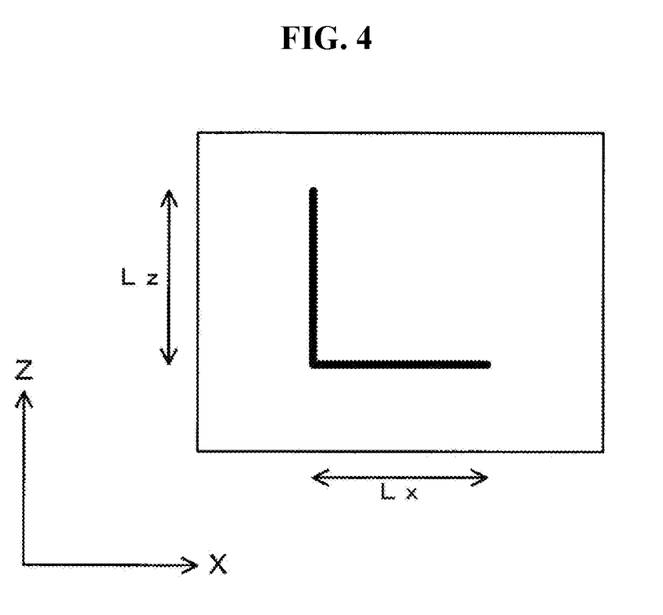
FIG. 4 is a diagram showing an example of a pattern drawn by means of a bright spot.

The drawing performed by the bright spot drawing unit 108 will be described below. FIG. 4 shows an example of drawing with the bright spot 301. In this example, the bright spot 301 is periodically reciprocated in an L-shape at a repetition frequency of about 1 to 5 Hz, so as to draw an L-shape. The drawing is performed in such a manner that the orientation and size of the L-shaped trajectory of the bright spot in the target surface are a predetermined particular orientation and size. The pattern drawn by means of the bright spot is not limited to a character, or may also be a triangle or an arrow or the like, as long as it can be recognized.

The pattern formed by the drawing described above moves along the path 302 of FIG. 1. In such case, the position of the pattern is mastered by the position of gravity center of the pattern or a predetermined position (an intersection point of a vertical line and a horizontal line, or the like, in the case of the L-shape). For example, in the case of FIG. 4, the L-shaped trajectory of the bright spot moves towards a direction in which the UAV 200 is desired to fly. At this time, since the distance measurement value fluctuates in the time axis, a value averaged at a particular interval (about 0.5 to 1 second) is used as the distance measurement value.

The pattern drawn by means of the bright spot is adjusted so as to have a predetermined size, aspect ratio and orientations at a position where the bright spot is formed. For the adjustment, information of the data related to the three-dimensional shape of the target object and the distance from the TS 100 to the bright spot is required. The data related to the three-dimensional shape of the target object is mastered by a three-dimensional model obtained in advance from a three-dimensional laser scanner or an image of stereo photo. The distance from the TS 100 to the target object is obtained by using the distance measuring function or the laser scanner function possessed by the TS 100.

In particular, when the spot-type indicating laser beam from an oblique direction irradiates the target surface for which a pattern is to be drawn with the bright spot, the pattern is drawn in such a manner as to have a shape obtained when the drawing is performed from the front side. In this case, the drawing is performed by using such as a projective transformation, that is, laser scanning data from the laser scanner 109 described later is used to calculate a normal vector of the target surface, and based on an angle formed between the normal vector and the optical axis of the spot-type indicating laser beam from the TS 100, a shape of the bright spot-drawn pattern is formed to be the shape obtained when the drawing is performed from the front side.

The laser scanner 109 performs laser scanning in the vicinity of a point (the bright spot 301) irradiated by the spot-type indicating laser beam to obtain three-dimensional point cloud data in the vicinity of the bright spot 301. By performing the laser scanning in the vicinity of the bright spot, an orientation of a surface of a target object in the vicinity of the bright spot 301 with respect to the optical axis of the TS 100 may be determined. That is, an orientation of a normal to the surface of the target object with respect to the optical axis of the spot-type indicating laser beam can be determined.

The laser scanner is described in, for example, Japanese Patent Publication No. 2010-151682, Japanese Patent Publication No. 2008-268004, U.S. Pat. Nos. 8,767,190, and 7,969,558. In addition, a laser scanner which performs electronic scanning without using rotation or reciprocation of an optical system is described in US Patent Publication No. 2015/0293224. The laser scanner in a form of performing electronic scanning can also be used.

(UAV)

Figure 3:
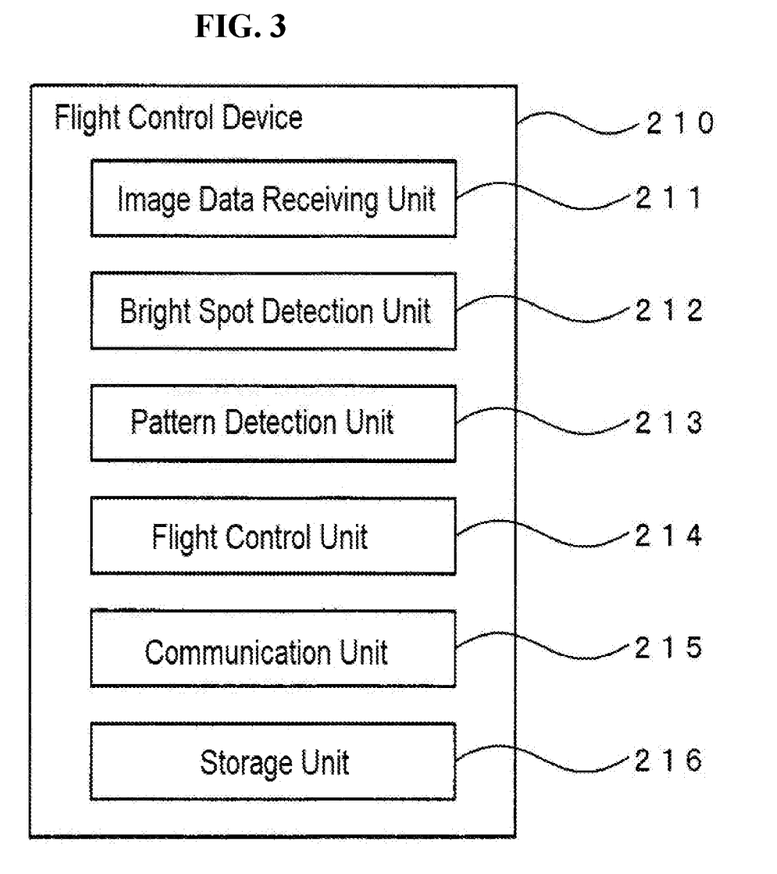
FIG. 3 is a block diagram of an embodiment.

The UAV 200 has a flight control device 210 of FIG. 3, a GSNN position determining device, an altimeter, a direction sensor, an IMU (Inertial Measurement Device), a tilt sensor, a wireless communication device, etc. Except for the flight control device 210, the others are all devices and functions possessed by an ordinary UAV, and thus the description thereof is omitted. In addition, in the case of a structure in which the posture of the camera 201 can be moved, the UAV 200 is equipped with a posture control device for the camera 201.

FIG. 3 shows a block diagram of the flight control device 210 included in the UAV 200. The flight control device 210 is hardware that functions as a computer, and has a CPU (Central Processing Unit), a memory and various interfaces. The flight control device 210 may consist of a generalpurpose microcomputer, or may also be developed as dedicated hardware. For example, the flight control device 210 may consist of electronic circuits such as a microcomputer plugin, an ASIC (Application Specific Integrated Circuit), an FPGA (Field-Programmable Gate Array) or the like.

The flight control device 210 has an image data receiving unit 211, a bright spot detection unit 212, a pattern detection unit 213, a flight control unit 214, a communication unit 215, and a storage unit 216. Some or all of these functional units may be in a form of software executing a program in the CPU, or may also be in a form of dedicated hardware.

The image data receiving unit 211 receives an image captured by the camera 201. In this example, the camera 201 captures a video, and the image data is received by the image data receiving unit 211. Furthermore, a high-speed shutter image with less video frames (for example, photographed every 0.1 seconds) may be used.

The bright spot detection unit 212 detects, from the image captured by the camera 201, a bright spot generated by irradiation of the spot-type indicating laser beam from the TS 100. The detection of the bright spot is performed by detecting, through digital processing, a pixel with higher brightness than surrounding pixels. In this example, the trajectory of the bright spot 301 is detected from a plurality of frame images included in the data of the stereo image captured by the camera 201. For example, the L-shaped trajectory of the bright spot in FIG. 4 is detected by the bright spot detection unit 212. In such case, the bright spot 301 is finely moved to draw a pattern. Therefore, a change of the trajectory obtained in a period equal to or more than the time taken to draw the pattern is averaged, and a set of bright spots drawing the pattern is detected. For example, it is assumed that it takes 0.5 seconds to draw an L-shaped pattern. In this case, a trajectory of a bright spot obtained by averaging the movement of the bright spot in a period of about 0.5 second to 0.7 second is detected. Furthermore, this trajectory is different from the Path 302 of FIG. 1, and is a trajectory repeated at short time intervals so as to draw the pattern as shown in FIG. 4.

The pattern detection unit 213 performs, based on the trajectory of the bright spot detected by the bright spot detection unit 212, the pattern detection. For example, in the case of FIG. 4, the pattern detection unit 213 is configured to detect the L-shaped pattern. This process is performed using a well-known shape recognition processing algorithm.

The flight control unit 214 performs a flight control over the UAV 200. The flight control performed by the flight control unit 214 includes, besides the flight control performed by a common UAV, a flight control based on a drawn pattern, specifically, the drawn pattern indicates a pattern, that is detected by the pattern detection unit 213, drawn by means of a bright spot generated by the spot-type indicating laser beam (for example, a L-shaped trajectory of the bright spot, FIG. 4).

An example of flight control, in the case where a pattern formed by irradiating the spot-type indicating laser beam (distance measuring light) onto a target object adopts the L-shape of FIG. 4, will be described below.

First, the position of the L-shaped pattern detected by the pattern detection unit 213 in a screen is detected. For example, it can be detected to treat the position of a gravity center of the L-shaped pattern in the screen as the position (an interested position) of the pattern in the screen. Then, the position of the UAV is controlled in such a manner that the interested position reaches a predetermined position (the lower left or center or the like) in the screen.

Next, an orientation of the L-shaped pattern detected by the pattern detection unit 213 on the screen is detected. Then, the posture of the UAV 200 is controlled in such a manner that the orientation becomes a predetermined orientation (for example, the orientation in FIG. 4). In this process, a control of the rotation about the X-axis of FIG. 1 is performed.

Next, the posture control of the UAV 200 is performed in such a manner that the L-shaped pattern has an aspect ratio close to a predetermined value (which is 1:1 in the case of FIG. 4). In the posture control using the aspect ratio of the L-shaped pattern (the bright spot-drawn pattern), a control of the rotation about the Z-axis in FIG. 1 is performed.

It is not limited to the aspect ratio, and a ratio of dimensions in the directions of two axes intersecting one another can also be used. However, preferably, an angle formed between the two intersecting axes is as close as possible to 90° (in an orthogonal state). In addition, a ratio of dimensions in the directions of three or more intersecting axes may also be used as a basis standard for determining. In this case, the posture control of the UAV is performed in such a manner that a ratio of dimensions of the pattern drawn by means of the bright spot in the directions of the three or more axes is closest to the predetermined value. For example, in the case that three axes are set to be intersected at an angular difference of 60°, the posture control of the UAV is performed in such a manner that a ratio of dimensions of the pattern in the directions of the three axes is a predetermined value.

If the posture control of the UAV 200 is performed using the aspect ratio of the above-mentioned L-shaped pattern in the screen, the position of the L-shaped pattern on the screen will change. Therefore, (1) an adjustment of the position of the UAV 200 based on the position of the L-shaped pattern in the screen, and (2) an adjustment of the posture of the UAV 200 based on the aspect ratio of the L-shaped pattern in the screen are alternately repeated, so that the position of the L-shaped pattern in the screen becomes a predetermined particular position, and that the aspect ratio of the L-shaped pattern in the screen is a predetermined value.

Next, the position of the UAV 200 is controlled in such a manner that the longitudinal and horizontal dimensions (Lx and/or Lz) of the L-shaped pattern in the screen are predetermined values. Here, when a distance between the position of the UAV 200 and the target object is larger than a predetermined value, Lx and/or Lz are/is smaller than a predetermined value. In addition, when the distance between the position of the UAV 200 and the target object is smaller than a predetermined value, Lx and/or Lz are/is greater than a predetermined value.

The position of the UAV 200 is controlled in such a manner that the size of the detected pattern on the screen is a predetermined value as described above, so that the distance between the target object, irradiated by the spot-type indicating laser beam (distance measuring light), and the UAV 200 (the position in the X-axis of FIG. 1) is a predetermined value.

The position where the L-shaped pattern of FIG. 4 is drawn moves along the path 302 of FIG. 1. By continuously performing the above-mentioned posture control and movement control at a time interval of 1 second, the UAV 200 maintains a particular posture and positional relationship with respect to a target object (for example, the wall surface 300 in FIG. 1), while moving along an indicated path as shown by reference numeral 302. That is, the UAV 200 moves along with the movement of the pattern formed by the bright spot 301 (the bright spot-drawn pattern).

Furthermore, in the actual flight of the UAV 200, firstly, the UAV 200 is brought close to the target object by a remote manipulation of a manipulator, and then the above-mentioned flight control using the spot-type indicating laser beam from the TS 100 is performed.

The communication unit 215 receives a signal from a manipulation controller manipulated by the manipulator. In addition, the communication unit 215 transmits various data (position data and so on) during the flight to the manipulation controller or an external device. The storage unit 216 consists of a semiconductor memory, and stores various data necessary for an action of the flight control device 210, data obtained as a result of the action, and a program necessary for the action. In addition, when the UAV 200 is equipped with the flight control device 210, a flight plan or a flight log, various data or programs necessary for the action of the UAV 200 are stored in the storage unit 216.

(An Example of Process)

Figure 6:
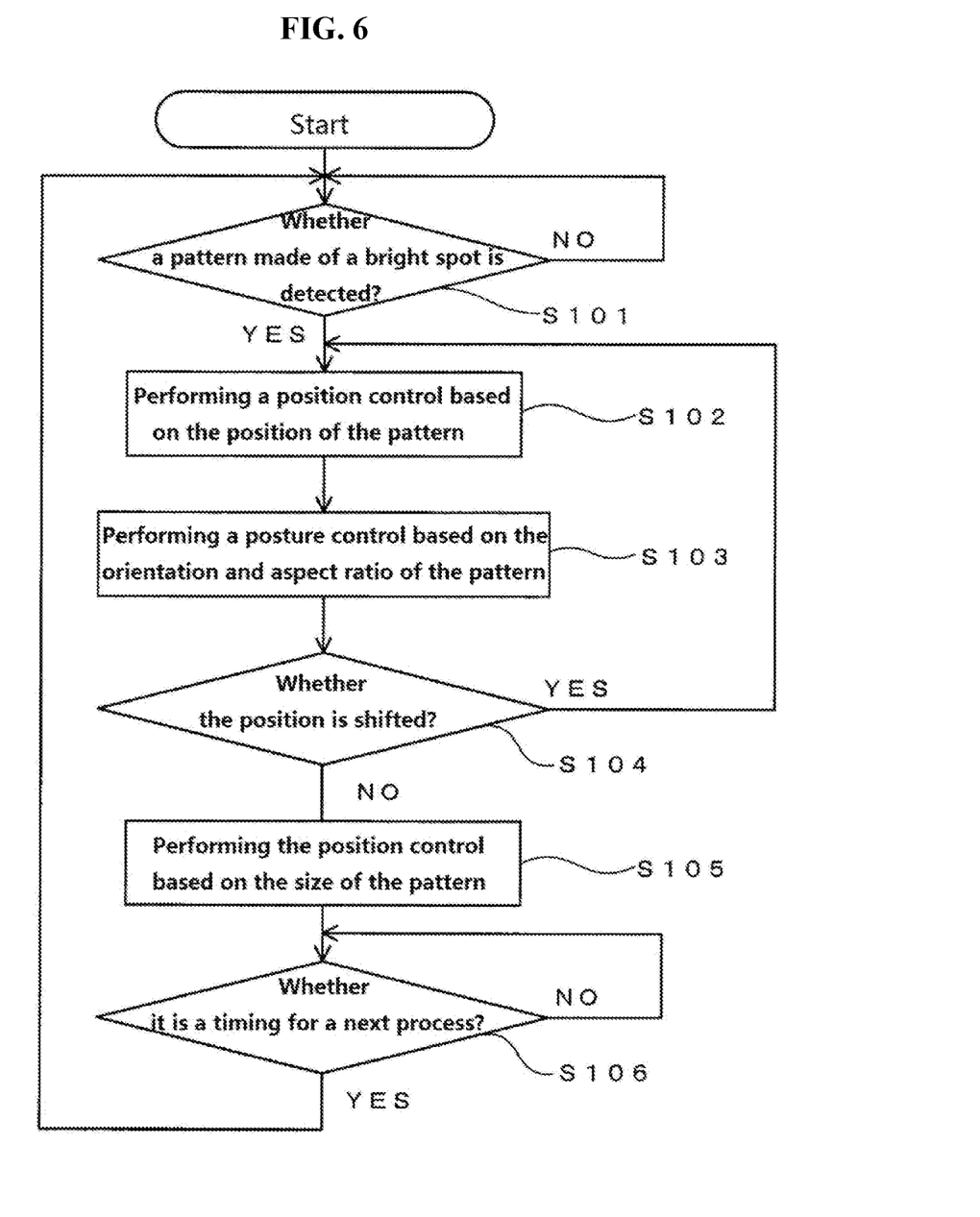
FIG. 6 is a flowchart showing an example of steps of process.

An example of process executed by the flight control device 210 will be described below. FIG. 6 is a flowchart showing an example of the steps of the process executed by the flight control device 210. A program for executing the process of FIG. 6 is stored in a suitable memory area such as the storage unit 216, and is executed by being read from the memory area. A configuration is also possible in which the program is stored in a suitable storage medium and provided from the storage medium.

Spot-type indicating laser beam irradiates a target object (for example, the wall surface 300 in FIG. 1), and the execution of the process of FIG. 6 is started at the stage where a pattern is drawn by means of a bright spot. If the process of FIG. 6 is started, it is firstly determined whether a pattern (a bright spot-drawn pattern) made of the bright dot 301 is detected (step S101). This process is executed by the pattern detection unit 212. When the bright spot-drawn pattern is detected, the process proceeds to step S102, otherwise, the step S101 is repeated while the UAV 200 is being moved up, down, left, and right.

Furthermore, if the time duration in which the pattern cannot be detected reaches a set time duration, it is determined as a situation where the bright spot 301 is not visible (loss I determined), and the situation is notified (the loss is signaled) to the controller, not shown, of the TS 100 or the UAV 200. In addition, at this time, the UAV 200 will be in a state of hovering in order to prevent an accident.

In step S102, the position control of the UAV 200 is performed based on the position of the bright spot-drawn pattern in a screen of an image captured by the camera 201. In this process, a flight control for adjusting the position of the UAV 200 is performed in such a manner that the position of the bright spot-drawn pattern in the screen becomes a predetermined particular position.

A detailed example of this process will be described below. First, it is assumed that orthogonal X-Y axes are set on the photographing screen. Here, the bright spot-drawn pattern is located in the X+ direction with respect to a predetermined screen position. In this case, the control of the movement of the UAV 200 is performed in such a manner that the screen flows in the X− direction. As a result, the position of the bright spot-drawn pattern in the screen moves towards the X− direction. In this way, the flight control is performed in such a manner that the position of the bright spot-drawn pattern in the screen is always at a constant position. As a result, the UAV flies in such a manner as to follow the bright spot-drawn pattern. The process related to the above flight control which causes the UAV to follow the bright spot-drawn pattern is executed by the flight control unit 214. Furthermore, the process of the following steps S102 to S106 is also executed by the flight control unit 214.

Next, the posture control of the UAV 200 is performed based on the orientation and the aspect ratio of the bright spot-drawn pattern (step S103). In this process, the adjustment of the posture of the UAV 200 is performed in such a manner that the bright spot-drawn pattern in the screen is closest to the predetermined orientation and the predetermined aspect ratio.

If the process of step S103 is performed, the position of the bright spot-drawn pattern in the screen will change. Therefore, a determining is performed in step S104, if the position of the bright spot-drawn pattern in the screen is shifted, the process starting from step 102 is executed again, and if the position of the bright spot-drawn pattern in the screen is not shifted, the process proceeds to step S105.

In step S105, the position of the UAV 200 is controlled based on the size of the bright spot-drawn pattern in the screen. In this process, the position of the UAV 200 is adjusted in such a manner that the bright spot-drawn pattern in the screen has a predetermined size. By this process, a distance between the target object and the UAV 200 (camera 201) becomes a predetermined particular value.

Then, it is determined whether it is the timing for a next process (step S106), and if it is the timing for next processing, the process starting from step S101 is repeated. For example, the process of steps S101 to S104 is repeatedly executed at an interval of 0.5 second to 2 seconds.

According to the above process, a pattern is drawn by the bright spot 301, and the pattern is moved along the path 302, thus the posture control of the UAV 200 using the bright spot 301, the flight control for maintaining the distance from the wall surface 300, and the control of the flight path can be performed. That is, the posture of the UAV 200 with respect to the wall surface 300 and the distance from the UAV to the wall surface 300 are controlled, while the UAV 200 moves in such a manner as to follow the bright spot 301 along the movement path 302 of the bright spot 301 (specifically, in such a manner as to follow the bright spot-drawn pattern formed by the bright spot 301).

(Advantage)

According to the present embodiment, the UAV can be efficiently guided to a particular part of a target object by the TS 100 using the spot-type indicating laser beam for guiding. In this technique, the UAV 200 adjusts, by image processing, its posture and position with respect to the target object. In this technique, for position control, it is unnecessary for the UAV to have a radar or a device for laser scanning, or even have a high-precision IMU. Therefore, the load at the side of the UAV related to the posture control and the position control of the UAV with respect to the target object can be reduced.

The flight of the UAV 200 at a certain distance from the wall surface 300 by a manual operation of the manipulator requires advanced technology and sometimes is difficult. In this regard, in the technique of the present embodiment, a flight control of the UAV 200 along the wall surface 300 can be performed without advanced manipulation techniques.

2. Second Embodiment

The following manners may also be adopted that data of an image captured by the camera 201 is transmitted by the UAV 200, the data is received by the TS 100 or other data processing devices, the data is processed at the side of these processing device on the ground, and a flight control signal generated after receiving the processing result is transmitted to the UAV 200, so as to manipulate the UAV 200. In this case, the TS 100 or a ground-installed device may be prepared as the flight control device in FIG. 3, and the process related to the bright spot generated by the spot-type indicating laser beam, that is originally executed by the flight control device 210, is performed at the side of the device on the ground. In this case, the hardware with which the UAV 200 is equipped can be simplified, and the calculation load at the side of the UAV 200 can be reduced.

3. Third Embodiment

For example, the horizontal control (posture control about the Y-axis and the X-axis in FIG. 1) of the vehicle body is performed using an output from the IMU or the tilt sensor possessed by the UAV 200. Moreover, the posture control about the Z-axis in FIG. 1 is performed, based on the dimensions of the bright spot-drawn pattern in the Z-axis and Y-axis directions in the image. That is, the posture control of the UAV 200 about the Z-axis is performed in such a manner that a ratio of the dimensions of the bright spot-drawn pattern in the Z-axis direction and the Y-axis direction in the screen of the captured image is a predetermined value (or range).

4. Fourth Embodiment

Figure 5:
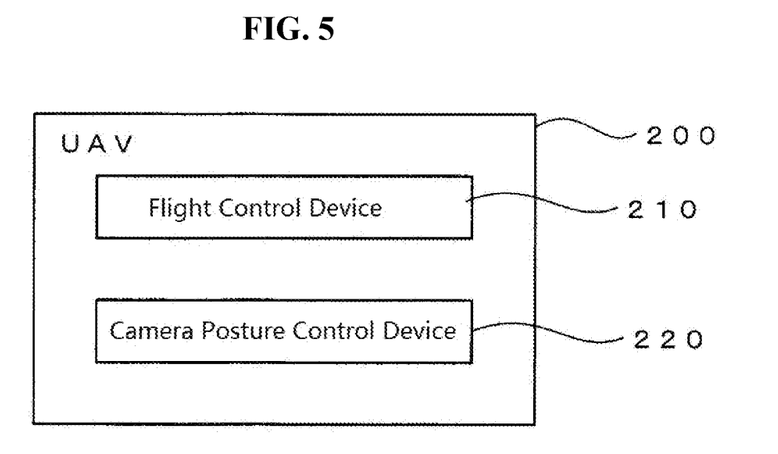
FIG. 5 is a block diagram of a UAV of an embodiment.

A configuration is also possible in which the orientation of the camera 201 with respect to the vehicle body of the UAV 200 can be variably controlled. In this case, the control over a pointing direction (posture control) of the camera 201 may be performed by using a pattern (a bright spot-drawn pattern) drawn by means of a bright spot generated by the spot-type indicating laser beam. In this case, the UAV 200 has a camera posture control device for controlling the posture of the camera 201. FIG. 5 shows an example of a block diagram of the UAV 200 including a camera posture control device 220.

For example, when a target surface is an inclined surface, sometimes it is difficult for the vehicle body to fly obliquely, thus the vehicle body is made horizontal, and the camera 201 is tilted in such a manner that an optical axis of the camera 201 is perpendicular to the target surface. In such process, a bright spot-drawn pattern may also be used. In this case, the orientation of the camera 201 is adjusted in such a manner that the aspect ratio of the bright spot-drawn pattern becomes a particular value. Furthermore, if the orientation of the camera 201 is adjusted, the position of the bright spot-drawn pattern in the screen will change, therefore, the adjustment of the orientation of the camera 201 and the adjustment of the position (and posture) of the UAV 200 are alternatively repeated in such a manner that the position of the bright spot-drawn pattern in the screen becomes a particular position and the aspect ratio thereof becomes a particular value.

A configuration is also possible in which both the posture control of the camera 201 and the posture control of the UAV 200 are performed using the bright spot-drawn image.

5. Fifth Embodiment

A configuration is also possible in which the UAV is flied basically by manual manipulation and a fine posture or position adjustment is performed using the bright spot-drawn image.

6. Specific Example

A specific example for inspecting a slope reinforced with concrete will be described below. In this case, the wall surface 300 in FIG. 1 is a slope reinforced with concrete. Hereinafter, the reference numeral 300 in FIG. 1 will be described as a slope. First, as a premise, positioning (or laser scanning) of a plurality of points on the wall surface 300 is performed by the TS 100, and a three-dimensional model of the wall surface 300 is obtained at a side of the TS 100. Alternatively, three-dimensional data of the slope 300 may be prepared in advance, and the three-dimensional data may be input to the TS 100.

Here, a location of the slope 300 that is to be photographed is set as the path 302. This setting is realized as follows. For example, a notebook computer is connected to the TS 100, and a three-dimensional model of the slope 300 stored by the TS 100 is displayed on a display of the notebook computer. The three-dimensional model is shown on three-dimensional coordinates with TS 100 treated as the origin or a map coordinate system (a coordinate system in which the coordinates are indicated by longitude/latitude/altitude from an average water surface). Then, the notebook computer is operated to set the path 302 on the three-dimensional model of the slope 300.

The position of the path 302 in a three-dimensional space can be determined by setting the path 302 on the three-dimensional model of the slope 300. The TS 100 is installed at a known position on the above-mentioned coordinate system. Then, the spot-type indicating laser beam from the TS 100 irradiates the position of a starting point of the path 302 on the slope 300, and a bright spot 301 is formed on the surface of the slope 300. In such case, a pattern in FIG. 4 is drawn by means of the bright spot 301 using the drawing function of TS 100. Next, the UAV 200 is manually manipulated to fly to a position where a screen of the camera 201 can capture the pattern formed by the bright spot 301.

Next, the pattern formed by the bright spot 301 is moved along the path 302 using the function of the TS 100. The TS 100 per se is a measuring device for performing a precise position measurement, and if a three-dimensional position is designated, the spot-type indicating laser beam (distance measuring laser) can irradiate the point. With such function, the pattern formed by the bright spot 301 is moved along the path 302.

The UAV 200 performs the process shown in FIG. 6, follows the pattern formed by the bright dot 301, and flies by following the movement of the pattern. In such case, the position control and posture control are performed using the appearance of the pattern. In addition, the slope 300 is photographed by the camera 201 during the flight. That is, video photographing of the slope 300 is performed along the path 302 by the camera 201.

In the above example, three-dimensional information of the slope 300 is obtained by the TS 100, and the TS 100 causes the bright spot 301 to move on the slope 300, so as to perform a control over the flight of the UAV 200. This can be understood that the flight of the UAV 200 is indirectly controlled by the TS 100 using the bright spot 301.

Usually, the inspection of the slope 300 is performed periodically. This is also the case for a bridge, or an inner wall of a tunnel, or the like. Therefore, if the path 302 is registered, the same flight control can be performed in a next inspection, which can save the work time.

(Others)

A configuration is also possible in which a light source for the spot-type indicating laser beam may be prepared in the TS 100 besides a light source for the distance measuring light. In addition, as to the light source for the spot-type indicating laser beam, not only the TS but also a laser pointer having a bright spot position control function and a bright spot drawing function can be used. In addition, a configuration is also possible in which an action instruction is given to the UAV by changing the shape of the bright spot-drawn pattern. For example, it may be a configuration in which an emergency return instruction is given by changing the shape of the bright spot-drawn pattern.

The technique shown in the present embodiment may be used in techniques for photographing, by a UAV, a wall surface or ceiling of a tunnel, an outer wall surface of a construction, an inner wall surface or ceiling of a room, a slope such as a cliff, a side surface or inner surface of a bridge, a wall surface of a bridge pier, a wall surface of a chimney, an outer wall surface of a heavy oil tank or a gas tank or the like, an outer wall surface of various mechanical equipment, an outer wall surface of a pipeline equipment, an outer wall surface of a plant equipment, outer side surfaces of a ship and an aircraft, and the like.

A configuration is also possible in which the bright spot drawing unit 108 in FIG. 2 is used as independent hardware, and a control signal for drawing with the bright spot is transmitted from the bright spot drawing unit 108 to the TS 100.

The structure in FIG. 5 may also be a structure in which the flight control device 210 and the camera posture control device 220 are combined rather than being separated. In this case, the flight control of the UAV 200 and the posture control of the camera 201 are performed by the control unit formed via the combination.

A configuration is also possible in which a stereo camera is used as the camera 201. In this case, relationships in relative three-dimensional position and orientation between the bright spot 301 and the UAV 200 are determined based on the captured image, and the posture and position of the UAV 200 with respect to the wall surface 300 can be controlled using the relationships. That is, the posture and position of the UAV 200 is controlled using a stereo image in such a manner that the UAV 200 always has a particular positional relationship with respect to the bright spot 301, whereby the flight control of the UAV 200 is performed in such a manner that the UAV 200 follows the bright spot 301 in a state where certain positional relationship and posture relationship are maintained.

In this case, hardware is prepared which has a bright spot position calculating unit based on a stereo image, and a flight control device. The flight control device is configured to control the flight of the UAV in such a manner that the position of the UAV with respect to the bright spot is a particular relative position. The hardware may be mounted on the UAV, or may also be configured at the side of the device on the ground.

What is claimed is:

1. A control device for an unmanned aerial vehicle, the unmanned aerial vehicle including a camera, wherein the control device for the unmanned aerial vehicle comprises:
   a bright spot detection unit configured to detect, from an image captured by the camera, a bright spot generated by a laser pointer, wherein a pattern is drawn by means of the bright spot and the pattern moves along a path; and
   a control unit configured to control a posture of at least one of the unmanned aerial vehicle and the camera based on a ratio of a first dimension and a second dimension of the pattern in the image captured by the camera, wherein the dimensions are arranged in multiple axial directions intersecting one another, and to control movement of the unmanned aerial vehicle based on movement of the pattern along the path.

2. The control device for an unmanned aerial vehicle according to claim 1,
   wherein the control unit is configured to control a position of the unmanned aerial vehicle, based on the position of the bright spot in the image captured by the camera.

3. The control device for an unmanned aerial vehicle according to claim 2,
   wherein the position of the unmanned aerial vehicle is controlled based on a size of the pattern in the image captured by the camera.

4. A measuring device, comprising:
   the control device according to claim 1, the laser pointer, and a three-dimensional position determination unit,
   wherein the three-dimensional position determination unit is configured to determine a three-dimensional position of the bright spot generated by the laser pointer,
   the bright spot moves in the pattern along the path, and positions of the path are obtained in advance.

5. A computer program product stored on a non-transitory computer readable medium for controlling an unmanned aerial vehicle, comprising code instructions which, when executed by a computer, cause the computer to function as a control device for the unmanned aerial vehicle including a camera,
   wherein the computer is caused to function as a bright spot detection unit and a control unit,
   the bright spot detection unit is configured to detect, from an image captured by the camera, a bright spot generated by a laser pointer, wherein a pattern is drawn by means of the bright spot and the pattern moves along a path; and
   the control unit is configured to control a posture of at least one of the unmanned aerial vehicle and the camera based on a ratio of a first dimension and a second dimension of the pattern in the image captured by the camera, wherein the dimensions are arranged in multiple axial directions intersecting one another, and to control movement of the unmanned aerial vehicle based on movement of the pattern along the path.

6. The computer program product according to claim 5,
   wherein the control unit is configured to control a position of the unmanned aerial vehicle, based on a size of the pattern in the image captured by the camera.

7. The computer program product according to claim 5,
   wherein the control unit is configured to control a position of the unmanned aerial vehicle, based on the position of the bright spot in the image captured by the camera.

8. The control device for an unmanned aerial vehicle according to claim 1,
   wherein the control unit is configured to control a position of the unmanned aerial vehicle, based on a size of the pattern in the image captured by the camera.

9. The measuring device according to claim 4,
   wherein the control unit is configured to control a position of the unmanned aerial vehicle, based on the position of the bright spot in the image captured by the camera.

10. The measuring device according to claim 4,
    wherein the position of the unmanned aerial vehicle is controlled based on a size of the pattern in the image captured by the camera.

* * * * *